United States Patent [19]

Grover et al.

[11] Patent Number: 5,737,518

[45] Date of Patent: Apr. 7, 1998

[54] METHOD AND APPARATUS FOR TESTING AN OBJECT MANAGEMENT SYSTEM

[75] Inventors: Douglas M. Grover, Elk Ridge; Tony L. Worwood, Nephi, both of Utah

[73] Assignee: Novell, Inc., Provo, Utah

[21] Appl. No.: 690,580

[22] Filed: Jul. 31, 1996

[51] Int. Cl.[6] .................................................. G06F 11/00
[52] U.S. Cl. .......................................................... 395/183.14
[58] Field of Search ........................ 395/183.14, 183.01, 395/183.02, 183.15, 185.01, 611, 614, 200.32, 200.53

[56] References Cited

U.S. PATENT DOCUMENTS

| | | |
|---|---|---|
| 5,432,907 | 7/1995 | Picazo, Jr. et al. . |
| 5,471,617 | 11/1995 | Farrand et al. . |
| 5,483,468 | 1/1996 | Chen et al. . |
| 5,506,955 | 4/1996 | Chen et al. . |
| 5,553,235 | 9/1996 | Chen et al. ............................. 395/182 |
| 5,655,081 | 8/1997 | Bonnell et al. .......................... 395/200 |
| 5,659,736 | 8/1997 | Hasegawa et al. ...................... 395/611 |

OTHER PUBLICATIONS

Simplesoft Inc., *SimpleTester User Guide*, Jun., 1995.
*MIB Tools: Coping with the Not-So-Simple Side of SNMP*, Data Communications, Mary Jander, Feb., 1992.

*Primary Examiner*—Vincent P. Canney
*Attorney, Agent, or Firm*—Dinsmore & Shohl LLP

[57] ABSTRACT

A method and apparatus for testing the implementation of an object in an object management system. The method and apparatus according to this invention automatically identify at least one attribute of a selected object, automatically generate one or more test signals as a function of the identified attribute, automatically analyze the response returned in response to the communicated test signal and report any detected errors. The method and apparatus of this invention help ensure that a developer of object management software has implemented the objects correctly.

22 Claims, 11 Drawing Sheets

METHOD AND APPARATUS FOR TESTING AN OBJECT MANAGEMENT SYSTEM

TECHNICAL FIELD

The present invention relates generally to network object management systems, and is particularly directed to a method and apparatus for validating that an object in such an object management system has been implemented properly.

BACKGROUND OF THE INVENTION

With the proliferation of local area networks and devices attached to such networks, monitoring and managing such devices has become increasingly important. There exist several protocols designed to enable network management of network attached devices, and many such protocols include a collection of objects and procedures for accessing the objects associated with a network attached device. For example, one relatively well known protocol for monitoring and managing network devices is the Simple Network Management Protocol (SNMP). Under SNMP, a network device has an object management system which includes an object database containing various objects relating to the network device, referred to as a Management Information Base (MIB), and agent software for querying and modifying the objects, referred to as an agent. A system being managed under SNMP also includes a management station running manager software which provides centralized control of the various network devices by communicating with the agent software over the network.

Manager software typically runs on a network attached computer and interfaces with a user through a graphical user interface. Manager software obtains information about the objects in the MIBs of the various network attached devices and allows a user to monitor, query or modify the objects in the MIBs. To monitor, query or modify an object the manager software sends a request over the network to the object management system. Agent software for examining or otherwise performing operations on the object examines the request, and if valid, carries out the request and sends a message back to the manager software. If the agent determines the request is invalid, for example the request is to write to an object which can only be read, the agent returns a message indicating an error.

In SNMP, the manager software typically obtains information about each network attached device's object management system via a MIB output file. A MIB compiler generates the MIB output file from one or more MIB input files, each of which contains the name of each object in a MIB structure, and the plurality of attributes which describe the objects and the valid operations which can be performed on the objects. The MIB input file reflects the objects and attributes associated with the objects as they were intended to be implemented in the object management system. The MIB compiler merges the one or more MIB input files and generates a MIB output file which contains the name of each object in the MIB and the plurality of attributes which describe the objects and the valid operations which can be performed on the objects.

For example, an object management system associated with a network device may contain an object entitled MaxSize. MaxSize has the attributes that it can be read and written (read-write) by the manager software, and can contain values between 10 and 100, inclusive. This information is entered into the MIB input file, and after being compiled, is stored in the MIB output file. The manager software reads the MIB output file and indicates to the user that the device's object management system contains a read-write object entitled MaxSize which can contain values between 10 and 100. The user of the manager software must assme that the developer of this MIB implemented this object properly in the object management system by developing agent software which allows the object MaxSize to be read and written, and which forbids any values outside of the range 10 to 100, inclusive. However, there is no guarantee that in fact the object was implemented properly in object management system. For example, the agent software may improperly allow values greater than 100 to be stored in the MaxSize object, or may forbid writing to the object.

In order to minimize such problems, developers of agent software develop test programs which test the agent, the objects and the attributes of the objects. Because each object usually has many attributes, such programs can be quite complex and time consuming to develop, and must themselves be tested and debugged. Further, the test program will necessarily have to be modified and debugged each time an object or an attribute of the object is modified.

Another method for testing the objects in an object management system is to create script files which contain specific operations directing a program to carry out to test the various attributes of an object. As with test programs, script files can be quite complex, require debugging, and must be modified each time an object is modified. Given the difficulty of accurately testing the implementation of an object in an object management system, it is not uncommon for objects in an object management system to be implemented with various problems, without the developer of the object management system or the user of the manager software being aware of such problems. Accordingly, it would be desirable to have a method and apparatus which automatically and rigorously tests the object and/or attributes of the object through the agent software, collectively referred to as testing the implementation of an object in an object management system, which identifies the attributes and/or objects that have been implemented improperly, and which does not require separate development and testing of specialized test programs or complex script files.

SUMMARY OF THE INVENTION

Accordingly, it is a primary object of the present invention to provide a method and apparatus for validating the implementation of an object in an object management system.

It is another object of this invention to provide a method and apparatus for automatically validating each testable object in an object management system.

It is another object of this invention to provide a method and apparatus for automatically validating each object of a particular type in an object management system.

It is yet another object of this invention to provide a method and apparatus which allows automatic testing of objects and agent software in an object management system without the need to develop complex customized scripts and/or programs.

It is still another object of this invention to provide a method and apparatus which provides a report which identifies any object and attribute which was not implemented properly in the object management system.

These and other objects of this invention are achieved with a method and apparatus for testing the implementation of an object in an object management system which includes a plurality of objects and procedures for accessing the objects. The object management system is accessible over a network and is associated with a network attached device. The method and apparatus of this invention can automatically identify one or more attributes of a selected object. The method and apparatus according to this invention automatically generate a test signal for testing the identified attribute, the test signal being generated as a function of the attribute. The test signal is communicated over the network to the object management system. If the test signal fails, the failure is reported, and the developer of the object management system is quickly and easily able to determine where problems in the object management system exist.

According to one preferred embodiment of this invention, an attribute of the object is retrieved from a structure which contains the names of the objects in the object management system and the attributes corresponding to the objects. Such a structure may be, for example, a compiler output file from a Management Information Base (MIB) compiler. According to another preferred embodiment of this invention, the attributes of the objects are retrieved from the object management system itself.

According to one embodiment of this invention, an attribute describing the object is retrieved and the test signal for testing the attribute is generated as a function of the attribute. The test signal can be, for example, an object query request or an object modification request which may be a valid signal according to the attribute, or maybe an invalid signal according to the attribute. Failure of a test signal may mean that there is no response to the test signal when a response is expected, or that there is a response code indicating that the test signal was a valid signal when it should have been considered an invalid signal, or that there is a response code indicating that the test signal was an invalid signal when it should have been considered a valid signal.

According to another preferred embodiment of this invention, rather than select a particular object to be tested, a user can specify that all objects in the object management system should be tested. The method according to this invention will automatically identify all objects in the object management system, and if the object is capable of being tested, will automatically generate one or more test signals and communicate the test signals over the network to the object management system to test the attributes of each object. Each response to the test signals from the object management system will be analyzed to determine if the response was correct.

According to yet another preferred embodiment of this invention, a user can specify a certain type of object to test, and the method according to this invention will automatically identify each object of the requested type of object to be tested, and will automatically identify the attributes of each of the objects. Test signals for testing the identified attributes will be generated and communicated over the network to the object management system and responses to the test signals will be analyzed for correctness.

According to yet another preferred embodiment of this invention, the method and apparatus according to this invention can allow the specified exclusion of certain objects or certain attributes of objects from being tested. Specification of the objects or attributes to be excluded from testing can be made via a graphical user interface, or can be entered into a file which can be read by the test signal generation process.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the descriptions serve to explain the principals of the invention. In the drawings.

DETAILED DESCRIPTION OF THE PREFERRED EMBODIMENT

Figure 1:
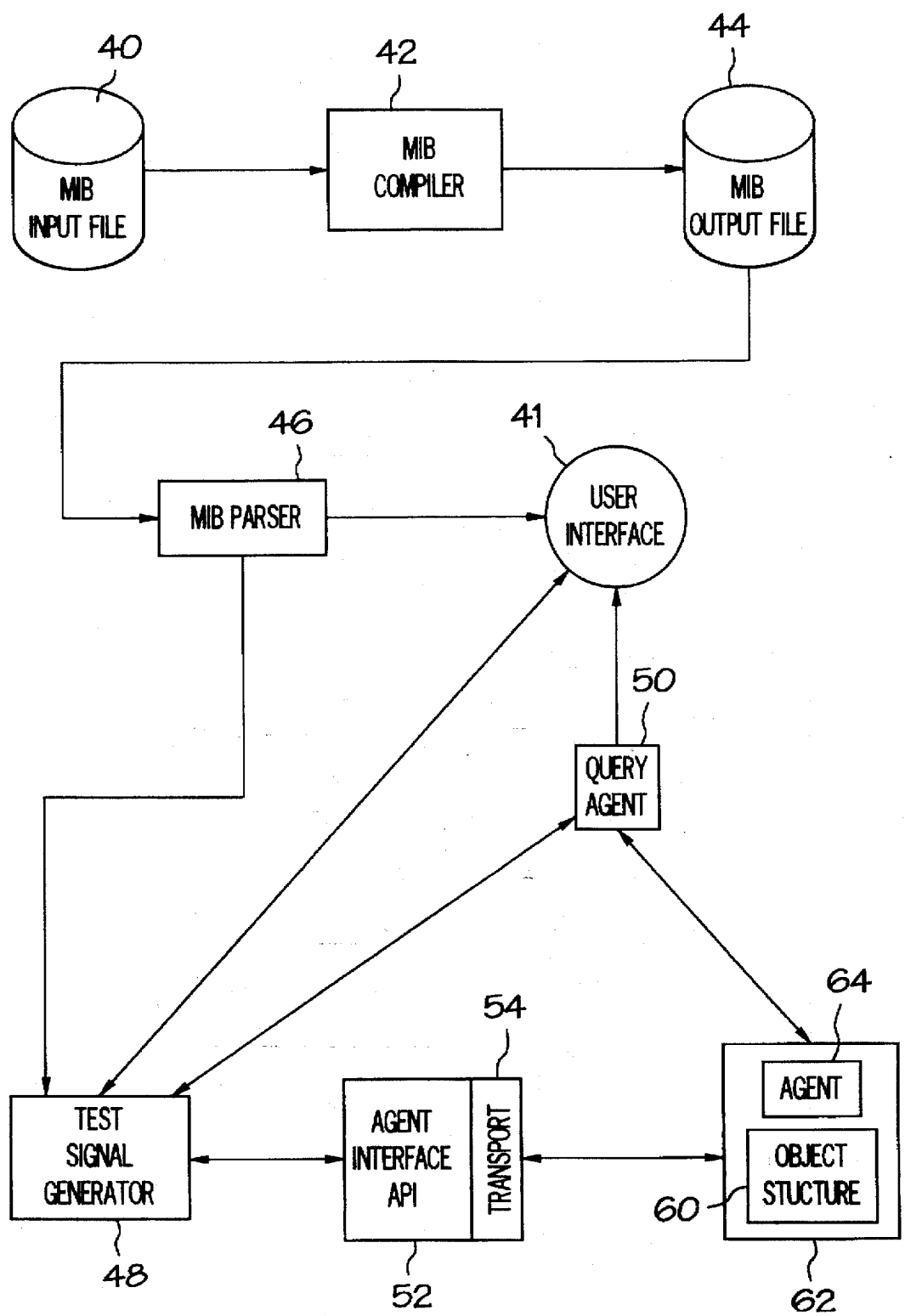
FIG. 1 is a block diagram showing the method and apparatus according to one preferred embodiment of this invention.

Throughout the specification reference is made to the Simple Network Management Protocol (SNMP) while disclosing the preferred embodiments of this invention. It is to be understood however, that the method and apparatus according to this invention are equally suitable to any network management protocol which includes objects associated with a network attached device, and software for performing operations on or accessing the objects. For example, the Novell Embedded Systems Technology (NEST) management protocol, developed by Novell, Inc., similarly includes objects associated with a network attached device, and software for accessing the objects. Thus, the method and apparatus according to this invention will find a wide range of applicability in the development of object management systems under many network management protocols.

Throughout the specification and claims, use of the phrases Management Information Base (MIB) or object structure collectively refers to the various objects in an object management system associated with a particular network attached device. Throughout the specification and claims the use of the phrases agent, agent software, or software for accessing the objects, relates to the software which is developed in conjunction with the objects for accessing and otherwise performing operations on the objects in an object management system associated with a network attached device. Throughout the specification and claims use of the phrase object management system refers collectively to both the objects associated with a network attached device and the software for accessing the objects.

Object structures associated with a network attached device, such as a MIB, can contain thousands of objects, each object having many attributes, and each attribute describing values that the object can contain, or what operations can be performed on the object. In order to properly implement the object, agent software must be developed that accurately enforces the attributes of the object. For example, if an object has the attribute that it is read-only, the agent software must prevent manager software from writing to the object. If the object has the attribute that it can only contain the values 1, 2 and 3, the software must prevent attempts to store a value of 4 into the object, and yet allow an attempt to store a value of 2 into the object. As can be readily understood, in view of the hundreds or thousands of objects that can exist in a single object management system, the effort to develop agent software which accurately enforces the attributes of the objects can be enormous.

Another simple example to illustrate the difficulty involved can be explained with the implementation of an object entitled SysContact in an object management system. The object SysContact has the attributes that it is of type Displaystring, can contain a string having a length from 0–255 bytes, and is read-write accessible. Thus, in order to properly implement the object SysContact in the object management system, the agent software must ensure that only Displaystring type data is stored in SysContact, that the length of the Displaystring is between 0–255 bytes, and that the access be both read and write. As is well known in the art of software development, proper development requires testing the software to ensure it works as intended. Just a few of the tests which a developer must perform in order to properly test the implementation of the object SysContact is 1) attempt to write a string having a length greater than 255 bytes to SysContact and ensure that an error code is returned, 2) attempt to write non-Displaystring data to the object and ensure that an error code is returned, 3) attempt to write a string having a length of 0–255 bytes to the object and ensure that an error code is not returned, 4) attempt to read the object and ensure that an error code is not returned, and 5) determine that the value written to the object was in fact stored in the object.

As can be readily appreciated, in view of the hundreds or even thousands of objects which can compose an object structure, such as a MIB, in an object management system, the development of such testing software is extremely burdensome and time consuming. Further, the program must be modified each time an attribute or object is modified. Moreover, in view of the large number of attributes which must be tested, it is possible that some attributes will unintentionally not be tested. Thus, object management systems are frequently improperly implemented, because the agent software does not enforce or properly implement the valid attributes of each object.

Another mechanism used by developers to test agent software is the use of a script file. A script file contains user specified commands which are read by a program and performed in order to test the implementation of one or more objects in an object management system. The problems associated with the use of script files are similar to those associated with the development of a program. First, the developer must create and insert into the script file a plurality of commands for testing each attribute of each object. Given the large number of objects in an object structure, and the corresponding large number of attributes, it is possible for a developer to inadvertently omit certain attributes or even objects from the testing process. Moreover, any change to the object structure entails changes to the script file. For instance, the addition of a new object to the object structure entails editing and adding additional tests to the script file for that particular object. Deletion of an object from an object structure entails searching through a script file for the commands used to test that object and removal of such commands from the script file.

The method and apparatus according to this invention frees the developer of agent software in an object management system from the time consuming and error-prone process of manually developing testing algorithms for an object management system. The method and apparatus of this invention obtains information regarding the objects and the attributes of the objects associated with an object management system, automatically generates test signals for testing the objects and the attributes, automatically communicates the test signals over the network to the object management system, and automatically analyzes the responses to the test signals and reports any errors encountered. Thus, the method and apparatus according to this invention helps ensure that the object was properly implemented in the object management system.

Network management protocols, such as SNMP, include a management station which runs manager software which allow a user to query, access and otherwise control the objects in an object structure, such as a MIB, associated with a network attached device. The manager software achieves such control by issuing messages over the network to the agent software associated with the MIB, requesting certain operations be performed on one or more objects. For example, the manager software may request that a particular value be stored in a particular object. It is the agent software's responsibility to ensure that the object allows write access, and that the value to be written to the object is a valid value, and that the manager's request complies with all other attributes of the object. If the agent determines that the requested operation is not permitted, an error is returned to the manager.

There are a variety of manufacturers of such manager software. Before the manager software can effectively control the object management system associated with a network attached device, it must first learn about the objects and attributes of the MIB. As mentioned above, a manufacturer of an object management system can provide a description of the objects and attributes in a MIB, in a file generally referred to as a MIB input file, which can be read by a MIB compiler. The MIB input file reflects the objects and attributes of the MIB as the manufacturer intended to implement them. A MIB compiler reads the MIB input file and generates a MIB output file, which the manager software reads to learn about the various objects in a particular MIB.

The method and apparatus according to one preferred embodiment of this invention obtains information about the objects and attributes of a MIB structure from a MIB output file. The method and apparatus can generate test signals to test the implementation of the object as specified in the MIB output file, and determine inconsistencies between the way the objects and attributes are described in the MIB output file and the way the objects and attributes are actually implemented in the MIB structure associated with the network attached device. The method and apparatus according to one preferred embodiment of this invention will be explained with reference to FIG. 1.

Test signal generator 48 determines which objects in object structure 62 of object management system 60 should be tested. According to one preferred embodiment of this invention, user interface 41 allows a user to specify a particular object, or a particular type of object, or that all objects in object structure 62 are to be tested. User interface 41 communicates the object selection to test signal generator 48. User interface 41 can communicate the name of the object, or any other identifier by which test signal generator 48 can determine which object's attributes must be obtained. It is apparent that test signal generator 48 could determine the selection through mechanisms other than user interface 41, such as a file or database in which the selection has been entered. For each object to be tested, test signal generator 48 automatically identifies the attributes of the selected object or objects, without the need for the user to specify the attributes of the object.

In certain environments, such as an SNMP environment, the automatic identification of attributes of an object occurs by reading MIB output file 44. The process of compiling MIB input file 40 and generating a MIB output file 44 via MIB compiler 42 is well known in the use of network manager software. Such manager software utilizes MIB output file 44 to obtain information about objects in an object management system.

The apparatus according to this invention can include MIB parser 46 which reads MIB output file 44 and selects the objects and attributes of the objects, and communicates such objects and attributes to test signal generator 48, as well as user interface 41. Such communication of objects and attributes can be on demand, or can be accomplished via an intermediate format such as a file, linked list, or other such data structure. Test signal generator 48 obtains the objects and attributes provided by MIB parser 46 and generates a test signal as a function of the attributes of the object to be tested. According to one preferred embodiment of this invention, user interface 41 obtains object identifiers from MIB parser 46 and displays the object identifiers for selection by a user. User interface 41 then communicates an index associated with the user selected object to test signal generator 48 which uses the communicated index to obtain the attributes associated with the object from a linked list created by MIB parser 46. Parsing routines for selecting keywords and values from a stream of data are well known to those skilled in the art and will not be described herein.

According to another preferred embodiment of this invention, MIB parser 46 reads MIB output file 44 and creates a separate file for each type of object in the MIB. For example, in an SNMP environment, MIB parser 46 can create a simple object file, a table object file and a trap object file. This file can then be used to quickly supply user interface 41 with all the names of objects of a particular type.

The automatic generation of a test signal is described in more detail below. The test signal can comprise an object query command or an object modification command, for example, and is communicated over the network to object management system 60. Object management system 60 comprises object structure 62 and agent 64 which includes the processes for accessing object structure 62.

Test signal generator 48 can utilize application programming interface 52 and transport 54, such as TCP/IP or SPX/IPX, or other transports known to those skilled in this art, to communicate the test signal over the network. The network can comprise a local area network, a wide area network, or any other suitable communications channel. Test signal generator 48 analyzes the responses to the test signals from agent 64, and reports any failures of a test signal. The report can be communicated to user interface 41, or can be sent to a printer or stored in a file. The report can include the attribute and object tested, and the reported failure from agent 64, or the failure to receive any response, as appropriate.

Failure of the test signal can comprise any suitable mechanism for determining that the object was incorrectly implemented. If the test signal generated by test signal generator 48 constitutes a valid test signal according to the attributes of the object tested, and object management system 60 returns an error response code, the test signal is deemed a failure. For example, if test signal generator 48 initiates a write to an object of object structure 62 which has an attribute read-write, and object management system 60 returns an error indicating that the object could not be written to, the test signal would be deemed a failure, and the failure reported. If test signal generator 48 generates an invalid test signal according to the attributes of the object, and object management system 60 returns a response code indicating no error occurred, the test signal would be deemed a failure. For example, receiving an indication no error occurred in response to an attempt to write a value to a read-only object would be deemed a failure of the test signal. If the tested object is not a not-accessible type object, then if object management system 60 fails to return a response code in response to a test signal from test signal generator 48, the test signal would be deemed to fail.

Some network management protocols acquire information regarding the objects and attributes of object structure 62 from object management system 60 itself, rather than an intermediate structure such as MIB output file 44. The same types of problems arise with such management protocols as with the SNMP environment. An object management system 60 can return attributes of an object which indicate that an object can only be read, yet agent 64 may erroneously allow manager software to store a value in the object. According to another preferred embodiment, this invention automates the testing of the objects in such an object management system. Test signal generator 48 obtains the names of objects and attributes from object management system 60. Query agent 50 acquires information about the attributes and objects of object structure 62 from object management system 60 and communicates this information to test signal generator 48 and user interface 41. User interface 41 can present a user with a list of objects from object structure 60. A user can specify that particular objects are to be tested, or that all objects of a specific type are to be tested, or that all testable objects are to be tested. User interface can communicate the objects to be tested to test signal generator 48, which in turn can obtain attribute information from query agent 50. Test signal generator 48 then creates test signals as a function of the attributes of the objects and communicates the test signals over the network to object management system 60 to determine if the object was implemented properly, as described above.

An example of a network protocol which returns the attributes of objects upon request is the NEST network protocol. The Application Programming Interface for accessing an object management system under NEST is described in the NEST Developer's Guide, available from Novell, Inc., in Provo, Utah. For example, the function NPCfGetNextItem can be invoked to determine the objects in a particular object management system, and the function NPCfGetItemSpecifics can be invoked to obtain the attributes regarding a particular item.

Figure 2:
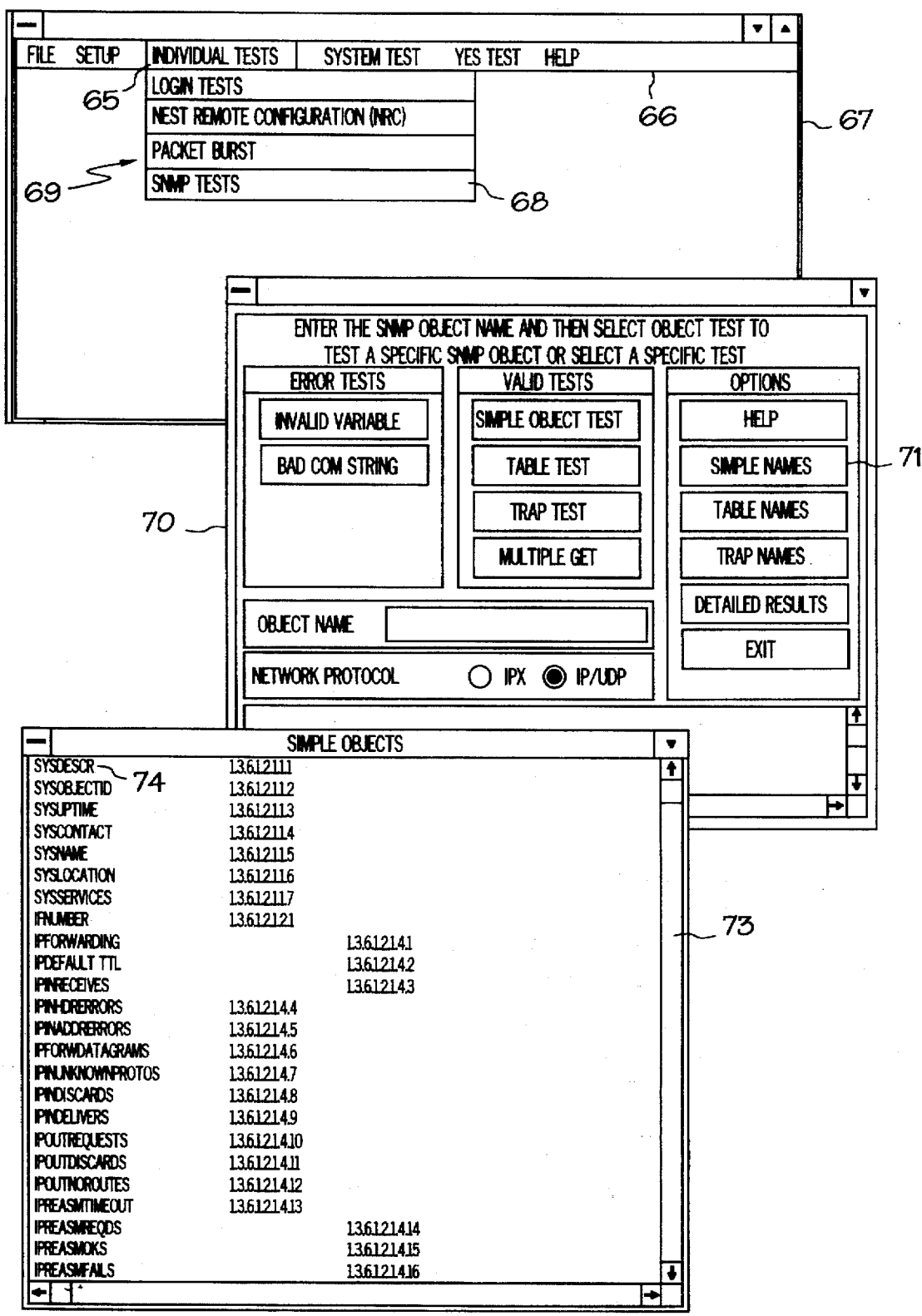
FIG. 2 illustrates a plurality of windows generated by a graphical user interface, according to another preferred embodiment of this invention.
Figure 3:
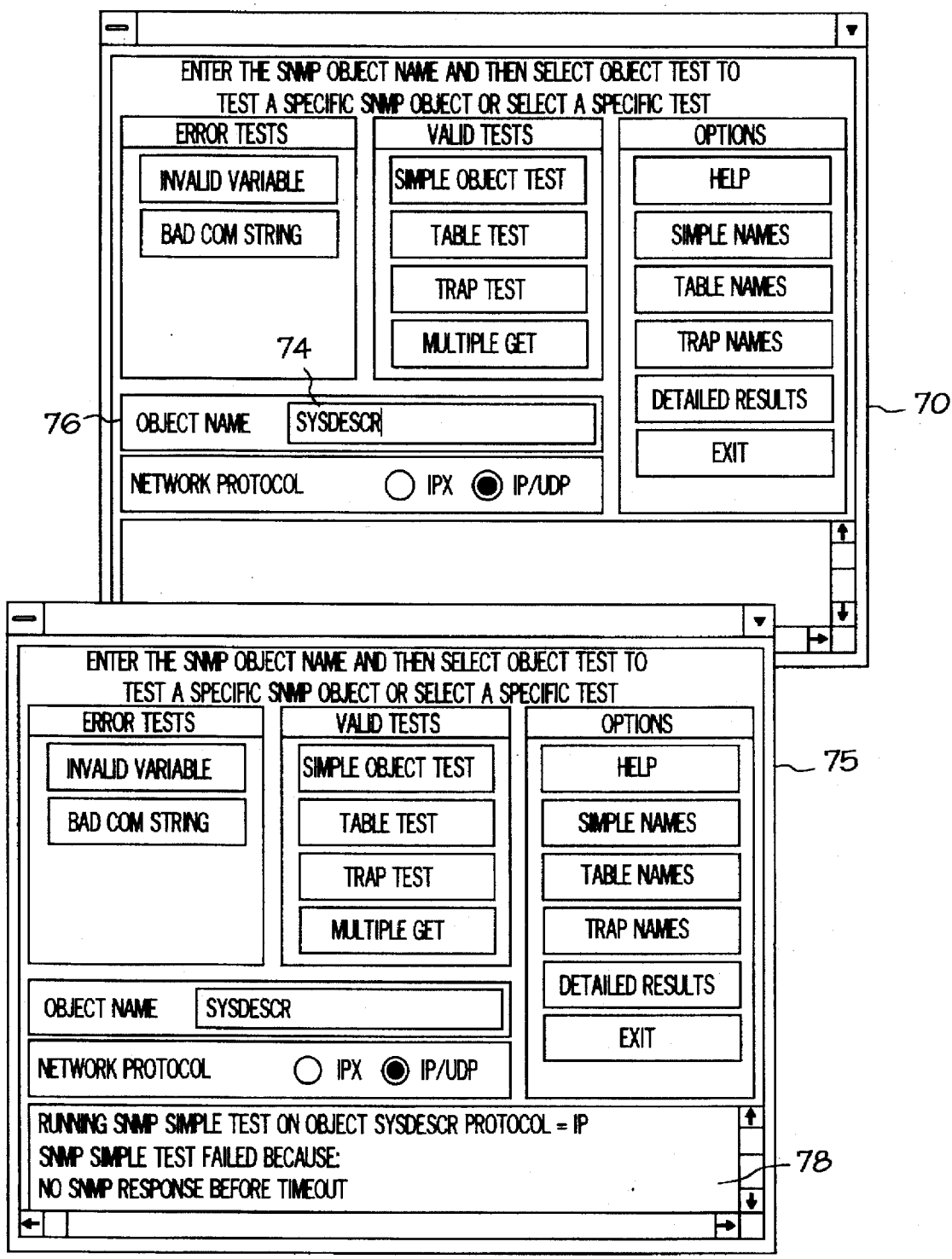
FIG. 3 illustrates additional windows generated by a graphical user interface, according to one preferred embodiment of this invention.

FIGS. 2 and 3 illustrate a chronological sequence of windows for selecting the appropriate objects to be tested, according to one preferred embodiment of this invention. As shown in FIG. 2, window 67 can include a menu bar 66 with various testing options which a user can select. For example, menu bar 66 allows for the selection of individual tests or system tests. Upon selection of a system test, user interface 41 communicates to test signal generator 48 to test each testable object in object structure 62. User interface 41 can communicate to test signal generator 48 the name or identifier of each object in object structure 62, or test signal generator 48 can obtain from MIB parser 46 or query agent 50 the name of each object in object structure 62. Test signal generator 48 can then obtain from MIB parser 46 or query agent 50 each object's corresponding attributes, and can generate test signals for each testable object as a function of the attributes of the object.

Upon selection of individual tests item 65 of menu bar 66, menu 69 is displayed. Menu 69 can enable the selection of specific tests of a particular protocol such as NEST or SNMP. Upon selection of menu item 68 window 70 can be presented which allows testing of a specifically named object, or testing of various types of objects, such as simple objects, table objects, or trap objects. Window 70 can also allow the display of the identifiers, or names, of objects by object type. For example, a user can activate simple names button 71 to obtain a list of all the simple objects in object structure 62. Window 73 illustrates such a window. The user can scroll through window 73 and select a particular object to be tested. As shown in window 73, sysDescr object 74 has been selected by a user. As shown in FIG. 3, upon returning to window 70, sysDescr object 74 can be pasted into object name field 76. Upon activation of the enter key, test signal generator 48 obtains attributes of the sysDescr object from MIB parser 46 and generates a test signal and communicates the test signal over the network to object management system 60. As shown in window 75 and as reported in field 78, the test signal failed due to a lack of response before a predetermined length of time.

Figure 4:
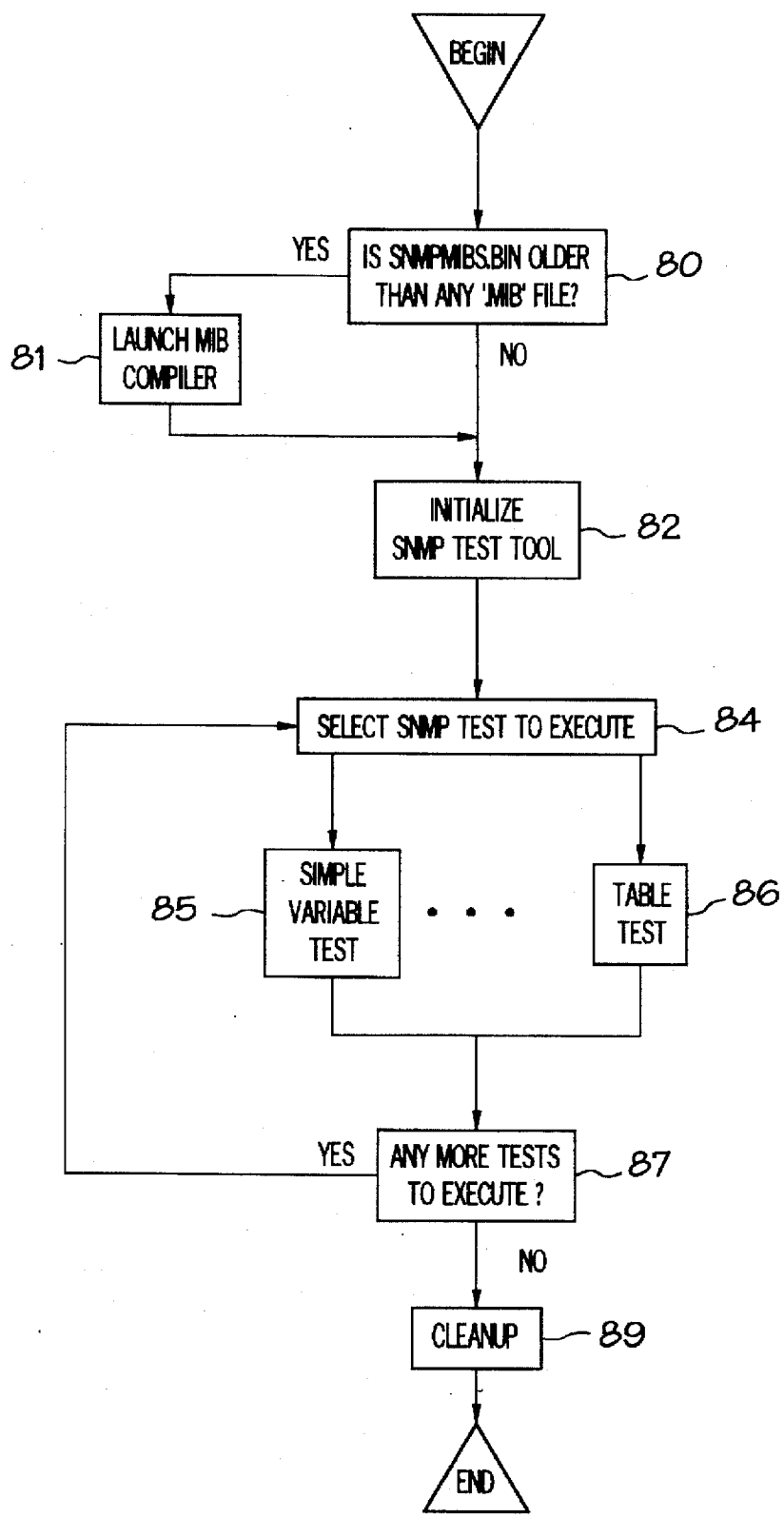
FIG. 4 is a flow diagram illustrating a flow of the method according to one preferred embodiment of this invention.

FIG. 4 is a flow diagram illustrating a general flow of the method and apparatus according to one preferred embodiment of this invention. At block 80 it is preferably determined whether MIB output file 44 (in this example entitled SNMPMIBS.bin) is older than any MIB input file 40. If MIB output file 44 is older than any MIB input file 40, MIB compiler 44 is launched at block 81 to generate a new MIB output file 44. One means for determining the date of MIB output file 44 with respect to any MIB input file 40 is to obtain from the system the creation date of each respective file. Launching MIB compiler 44 ensures that any changes made in a new MIB input file 40 are properly reflected in MIB output file 44.

At block 82 the appropriate processes, such as test signal generator 48 and user interface 41, initialize any required variables. At block 84 user interface 41 displays one or more appropriate windows, such as windows 67 and 70 of FIG. 2, to allow user selection of one or more objects to test. This selection could also take place without a user interface through a file or other data structure. After the appropriate selection, the tests are carried out as indicated at blocks 85-86. As discussed above, such tests can include testing a single object, testing all the objects of a particular type, such as table objects, or testing all testable objects. By testable objects, it is understood that some objects are merely logical constructs, such as a table identifier, which identify a substructure, and have no testable attributes. Such structures may even have the attribute that they are not-accessible, depending on the network management protocol being used. After the tests are completed, user interface 41 can allow the user to select additional tests at block 87, or can proceed directly to block 89 where all appropriate final processing is conducted prior to termination of the apparatus according to this invention.

Figure 5:
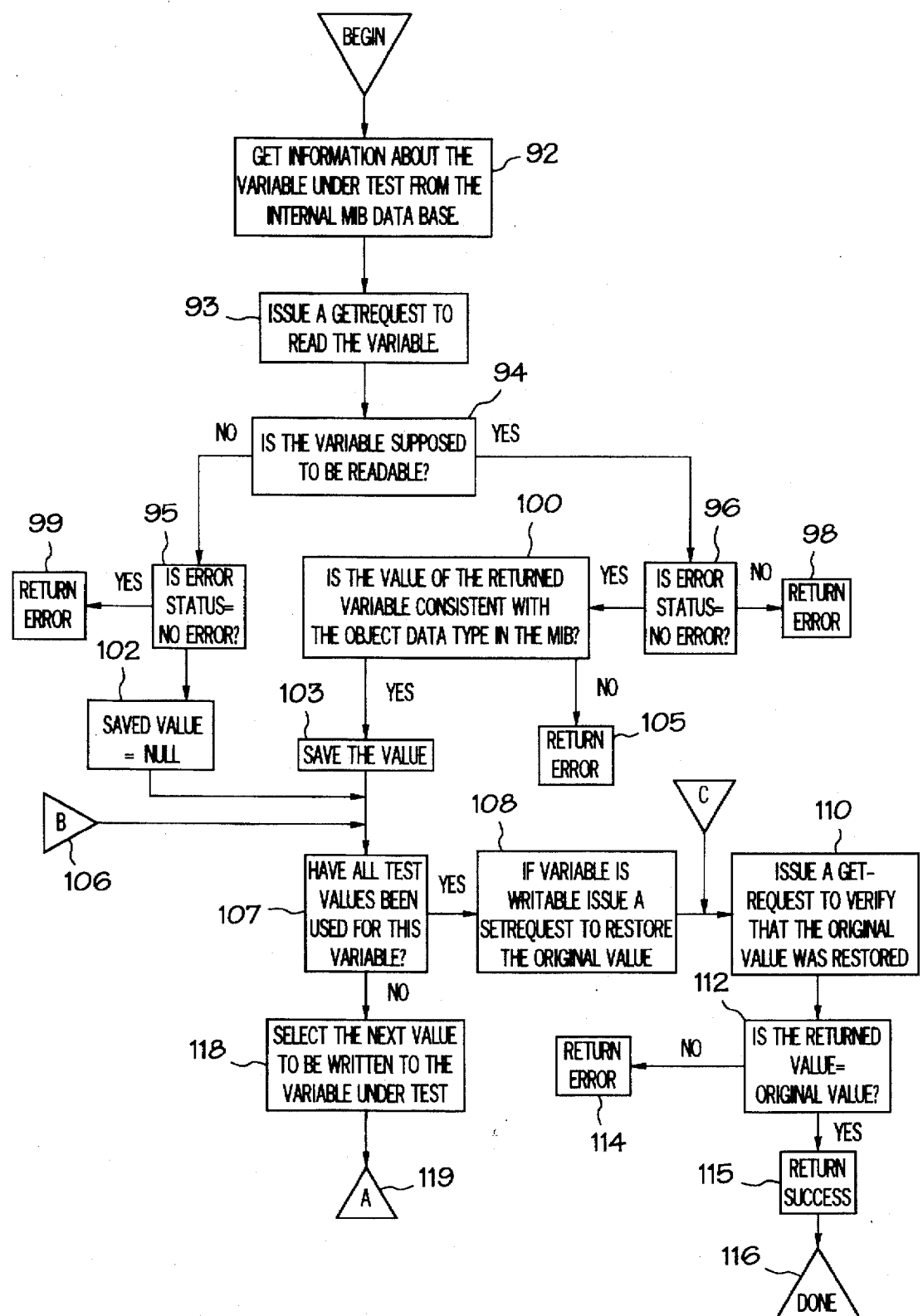
FIGS. 5 and 6 are flow diagrams showing a method of automatically generating a test signal for testing an object in an object management system over a network according to one preferred embodiment of this invention.
Figure 6:
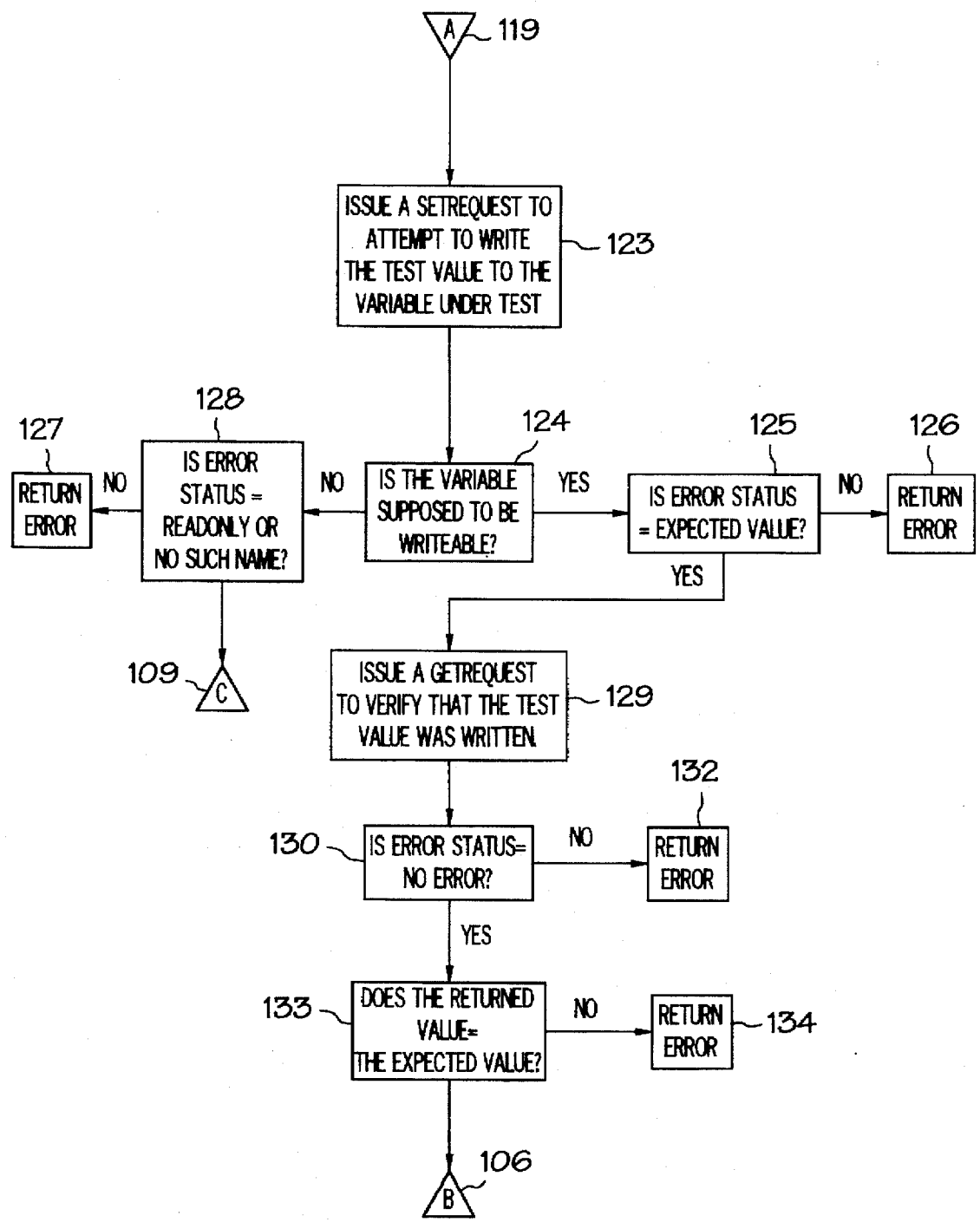

A method according to one preferred embodiment of this invention for carrying out the automatic identification of at least one attribute of a selected object, and automatically generating a test signal for testing the identified attribute is illustrated in FIGS. 5-6. FIGS. 5-6 roughly correspond to the process represented by block 85 of FIG. 4. At block 92 of FIG. 5, the attribute information of the object to be tested is obtained from MIB parser 46 or query agent 50. According to one preferred embodiment of this invention, a request to read the object is initiated at block 93 over the network to object management system 60 to determine if the object can be read. At block 94 it is determined whether or not the object was indicated by MIB parser 46 or query agent 50 to be readable. If the object was indicated as readable, at block 96 it is determined if object management system 60 returned a no_error response code in response to the read request from block 93. If a no_error response code was not returned test signal generator 48 reports the failure of the test signal. If the object to be tested was not supposed to be readable, at block 95 it is determined whether the response code returned by agent 64 was a no_error response code. If the response code was a no_error response code test generator 48 returns an error since the object was not supposed to be readable. If the response code is not equal to no_error, the value, which should be a null value since the object is not readable, is saved. Returning to block 96, if the response was a no_error response code, at block 100 it is determined whether the type of returned value is consistent with the object data type specified for that object. If the type of returned value is inconsistent with the object data type specified, test signal generator 48 returns an error at block 105. If the returned value is consistent with the object data type then the value returned is saved at block 103.

Block 107 is the beginning of the write-testing portion of the process, according to one preferred embodiment of this invention. The condition at block 107 is imtiaily NO in order to proceed to block 118 to ensure the object is written to at least once. At block 118, a value is selected to be written to the object. The process at blocks 107 and 118 determine what values should be written to the object under test. For example, if an attribute of the object is that the object can only contain the values 1–10, inclusive, the process can ensure that both valid values (numbers within the range) and invalid values (numbers outside of the range) are written to the object to ensure the appropriate response is returned in response to each test signal.

The process continues at block 119 on FIG. 6. At block 123 a write request is communicated by test signal generator 48 to object management system 60. At block 124 it is determined whether the object is indicated as writable. If the object is not supposed to be writable, at block 128 it is determined whether the response code indicated that the object is read-only. If the response code properly indicated that the object was read-only, the remainder of the write testing is bypassed, and control returns to block 110 of FIG. 5. If agent 64 did not properly return a read-only response code, test signal generator 48 reports an error at block 127.

Turning to block 110 of FIG. 5, an object query request is communicated by test signal generator 48 to object management system 60 to obtain the original value of the object under test. At block 112 the value returned from agent 64 in response to the object query request is compared to the value previously saved at either block 102 or block 103. If the return value is not the same as the previously saved value, an error is returned at block 114. If the value returned is identical to the previously saved value, then successful completion of the test of this object is indicated at block 115.

Referring again to block 124 of FIG. 6, if the object under test is supposed to be writable, the response code is tested at block 125 to determine if an error was returned. If an error was returned, test signal generator 48 reports the error at block 126. If at block 125 the response code returned was the expected response code, then at block 129 test signal generator 48 communicates an object query request to object management system 60 to determine if the value returned is identical to the value written. At block 130 the response code is examined to ensure that no error was returned. At block 133 the returned value is compared to the expected value. If the returned value is not equal to the expected value an error is returned at block 134. If the returned value is equal to the expected value control returns to block 106 of FIG. 5.

At block 107 test signal generator 48 determines if there are additional values to write to the object under test. If there are, control again returns to block 118 for selection of a value and then to block 119 of FIG. 6 as described above. If there are no additional values to be written to the object under test, control goes to block 108 where it is determined if the object is writable, and if so a write request is communicated to object management system 60 to restore the object to its original value which was saved in memory at blocks 102 or 103. Thereafter, blocks 110–116 are executed as described above.

It is understood that the flow diagrams in FIGS. 5 and 6 describe only one particular method for automatically generating a test signal for an object according to this invention. It will be apparent to those skilled in this art that the steps set forth in FIGS. 5 and 6 above could be implemented in a different order, or additional steps could be added to achieve similar results, and that additional testing or less testing may be appropriate depending upon the particular type of object to be tested.

In general, for a particular object, each of the following test signals should be generated, if appropriate, to properly test the implementation of the object: 1) a minimum allowed value should be written to the object; 2) a value less than the minimum allowed value should be written to the object; 3) a maximum allowed value should be written to the object; 4) a value greater than the maximum allowed value should be written to the object; 5) for enumerations each allowed value should be written to the object and at least one non-allowed value should be written to the object; and 6) for string objects minimum and maximum length strings of both allowable and non-allowable characters should be written to the object.

The proper syntax for generating object query requests and object modification requests are typically well documented in books and manuals about the particular network protocol being tested. For example, the get-request and set-request messages used in SNMP to read and write to objects are well documented and known to those skilled in the art. Other network protocols, such as the NEST network protocol from Novell, Inc. are also well documented and available to those skilled in the art. For example, the NEST Developer's Guide, available from Novell, Inc. of Provo, Utah, documents the appropriate functions for reading and writing an object in a NEST object management system.

Figure 7:
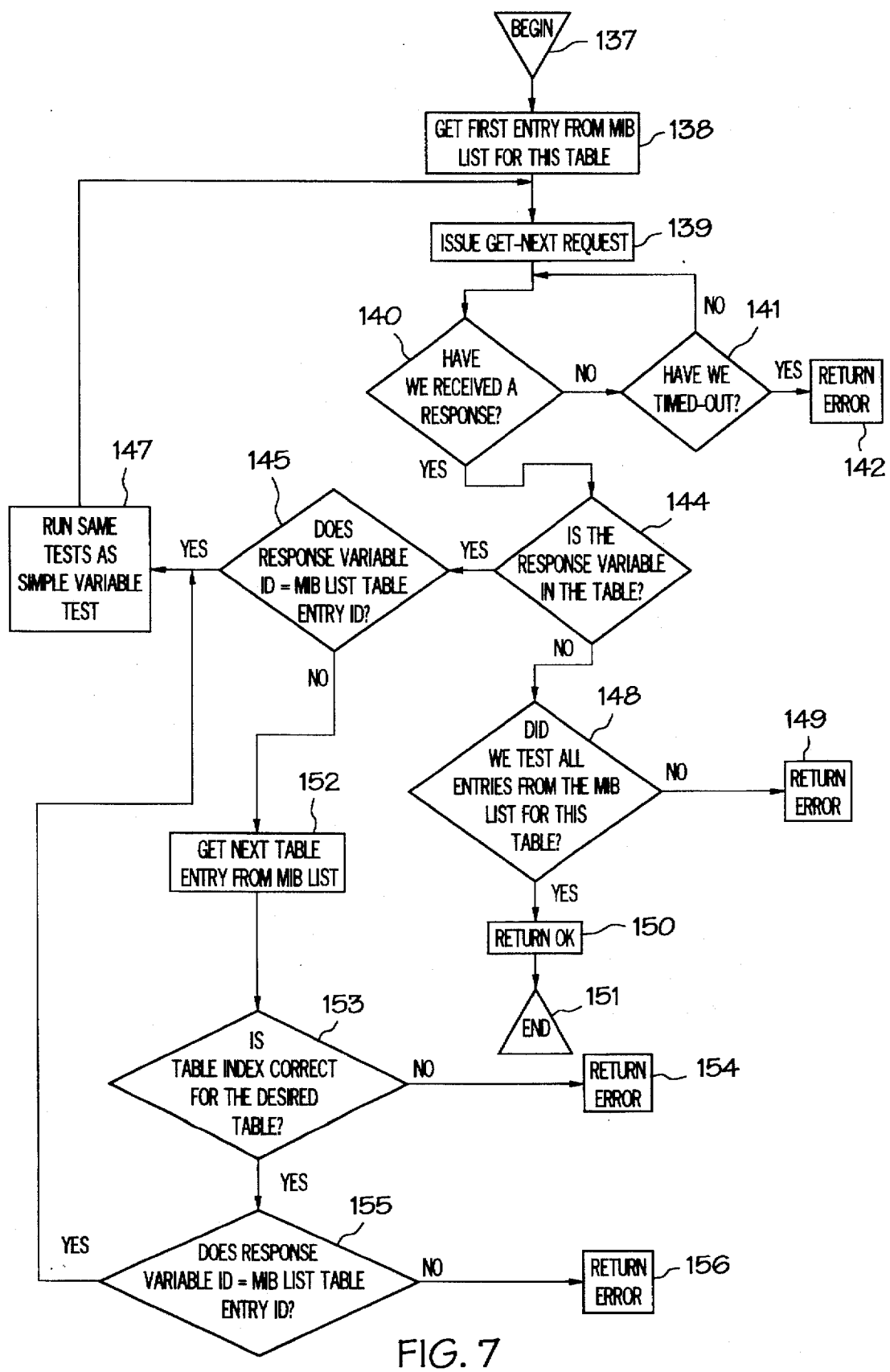
FIG. 7 is a flow diagram showing a method for automatically generating test signals for testing a table-type object in an object management system over a network.

Certain types of objects in object management system 60 can be implemented as tables. A table can include zero or more rows, each row comprising various objects. Methods for accessing the objects in a row of a table in network protocols such as SNMP are known to those skilled in the art and will not be described herein. FIG. 7 illustrates a flow diagram for testing table objects under the SNMP protocol according to one preferred embodiment of this invention. References to the MIB list in FIG. 7 refer to the list of table objects obtained from MIB output file 44 by MIB parser 46. After a table object is selected by a user, test signal generator 48 obtains from MIB parser 46 the first entry for the selected table at block 138. A request is issued to object management system 60 to obtain an entry from the table at block 139. At blocks 140 and 141, test signal generator 48 waits a predetermined amount of time for a response. After waiting the predetermined amount of time without receiving a response, test signal generator 48 returns an error at block 142. If a response is received within the predetermined amount of time, the object identifier of the returned object can be compared to that of the object identifier of the table to determine if the object belongs to the table. In SNMP, each object has an object identifier which comprises a series of digits and periods which identify the object's location in the MIB structure. Because a MIB structure is a tree structure, objects within a table will have a nearly identical object identifier as the table object itself. If the object does not belong to the table, test signal generator 48 can determine at block 148 if all entries of the table, as indicated in MIB output file 44 were tested. If test signal generator 48 determines that additional objects remain in the table, but were not returned from object management system 60, an error is returned at block 149. Otherwise, the process terminates without an error condition.

If the object identifier of the returned object indicates that it is a member of the table object under test, then at block 145 test signal generator 48 determines whether the object returned is an object from the same column of objects in the table currently under test, or is the first object of the next column of objects in the table to test. If the object belongs to the same column as the last object tested, the attributes of the object need not be obtained because they will be identical to the last object tested, and testing of the object begins at block 147. If the object is from a new column, then at block 152 test signal generator 48 obtains the object and attributes for the next column of objects under test. At block 153 test signal generator 48 ensures that an internally maintained index of the object matches an internally maintained index for the table. At block 155 test signal generator 48 ensures that the object returned at block 140 is an object from the column of objects now under test. Control then branches to block 147 for testing the object, such as the process illustrated in FIGS. 5 and 6.

Test signal generator 48 can also ensure that object management system 60 has properly implemented the ability to return multiple object values in response to a single test signal, if permitted by the particular network management protocol being utilized. For example, under SNMP, manager software can issue a single read request which requests agent 64 to return the values of several objects at one time. Agent 64 obtains the values from the appropriate objects and returns the values to the manager software. According to one preferred embodiment of this invention, test signal generator 48 will cycle through all objects of a particular type generating and communicating test signals to object management system 60 requesting the values of a plurality of simple objects. Test signal generator 48 will analyze the response from object management system 60 and report any errors. For example, if object structure 62 contains four simple objects entitled object 1, object 2, object 3 and object 4, test signal generator 48 can first request the values of objects 1, 2 and 3, then the values of objects 2, 3 and 4, then the values of objects 3 and 4, and finally the value of object 4, to ensure object management system 60 has properly implemented the ability to return multiple values at one time.

Another type of object which can be implemented in a network management protocol such as SNMP or NEST is a "trap" object. A trap event is a notification from object management system 60 over the network that a certain event has occurred at object management system 60. For example, trap objects can include a fatal message trap object which can be generated upon any event which object management system 60 determines is a fatal event. Types of trap objects can vary among various network management protocols, and can be enterprise specific. For example, in addition to a fatal message trap object, trap objects can include non-fatal message trap objects, warning message trap objects, cold start trap objects, and the like. The method and apparatus according to this invention can also be used to test trap objects in object management system 60.

Figure 8:
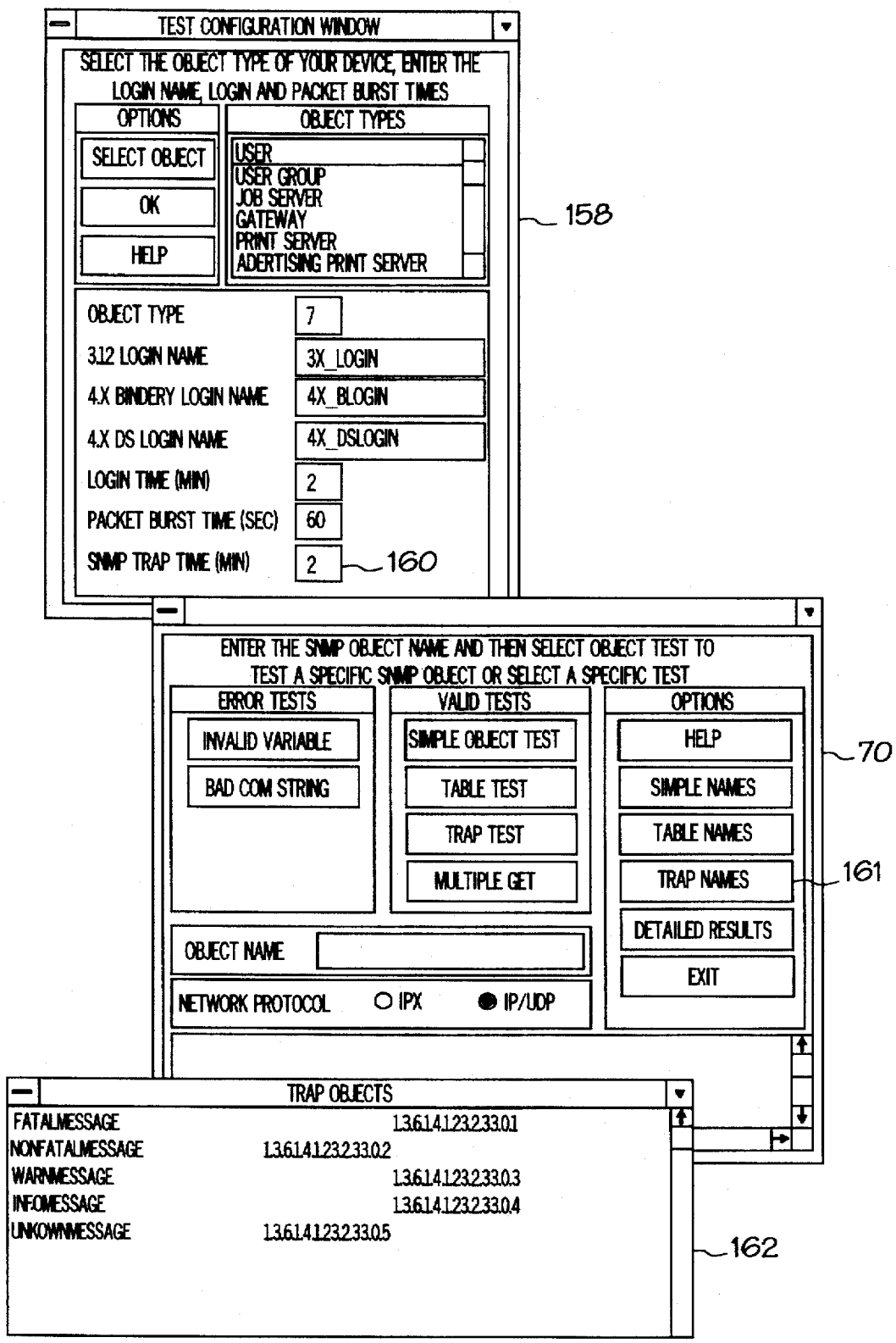
FIGS. 8 and 9 illustrate windows displayed by a graphical user interface according to one preferred embodiment of this invention.
Figure 9:
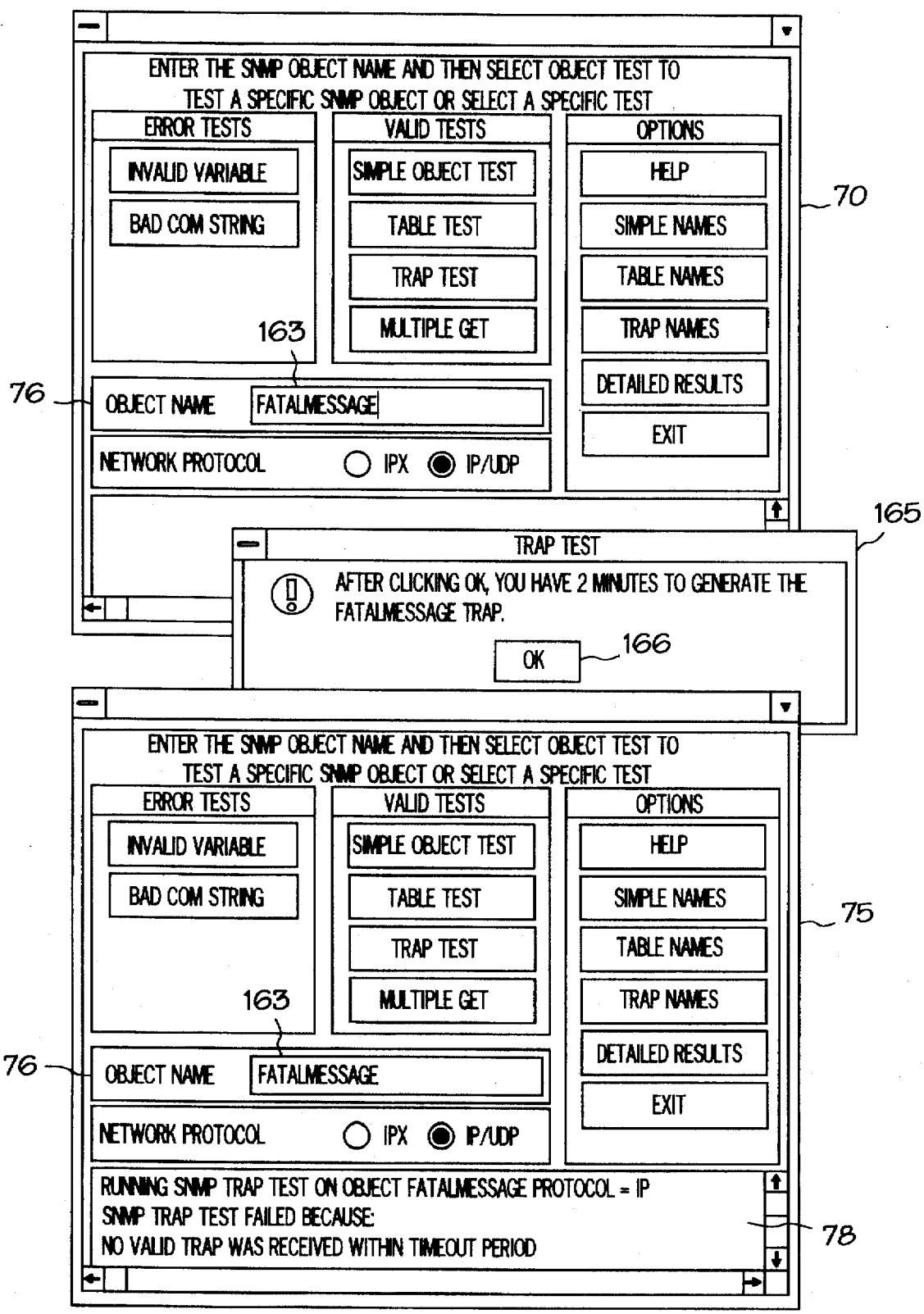

As shown in FIG. 8, the method and apparatus according to this invention can display window 158 which contains SNMP trap time field 160 for user specification of an amount of time to wait for a trap to occur. After completing trap time field 160, window 70 can be displayed to allow user selection of a particular type of object to test. Trap names field 161 can be actuated to display the implemented trap objects for a particular object management system 60 in window 162. As shown in window 162, fatal message trap object 163 has been selected. As illustrated in FIG. 9, fatal message trap object 163 can be entered into object name field 76 of window 70. The enter key can then be actuated to cause test signal generator 48 to begin the process to test fatal message trap object 163. Window 165 can be displayed to notify the user of a predetermined amount of time in which the occurrence of the event associated with the trap object must occur. The method and apparatus according to this invention will wait the user specified time, in this instance 2 minutes, for the trap event to be generated by object management system 60 and communicated over the network. As illustrated in field 78 of window 75, test signal generator 48 indicates that the test of the trap object failed because object management system 60 did not generate a trap event within the predetermined amount of time.

Figure 10:
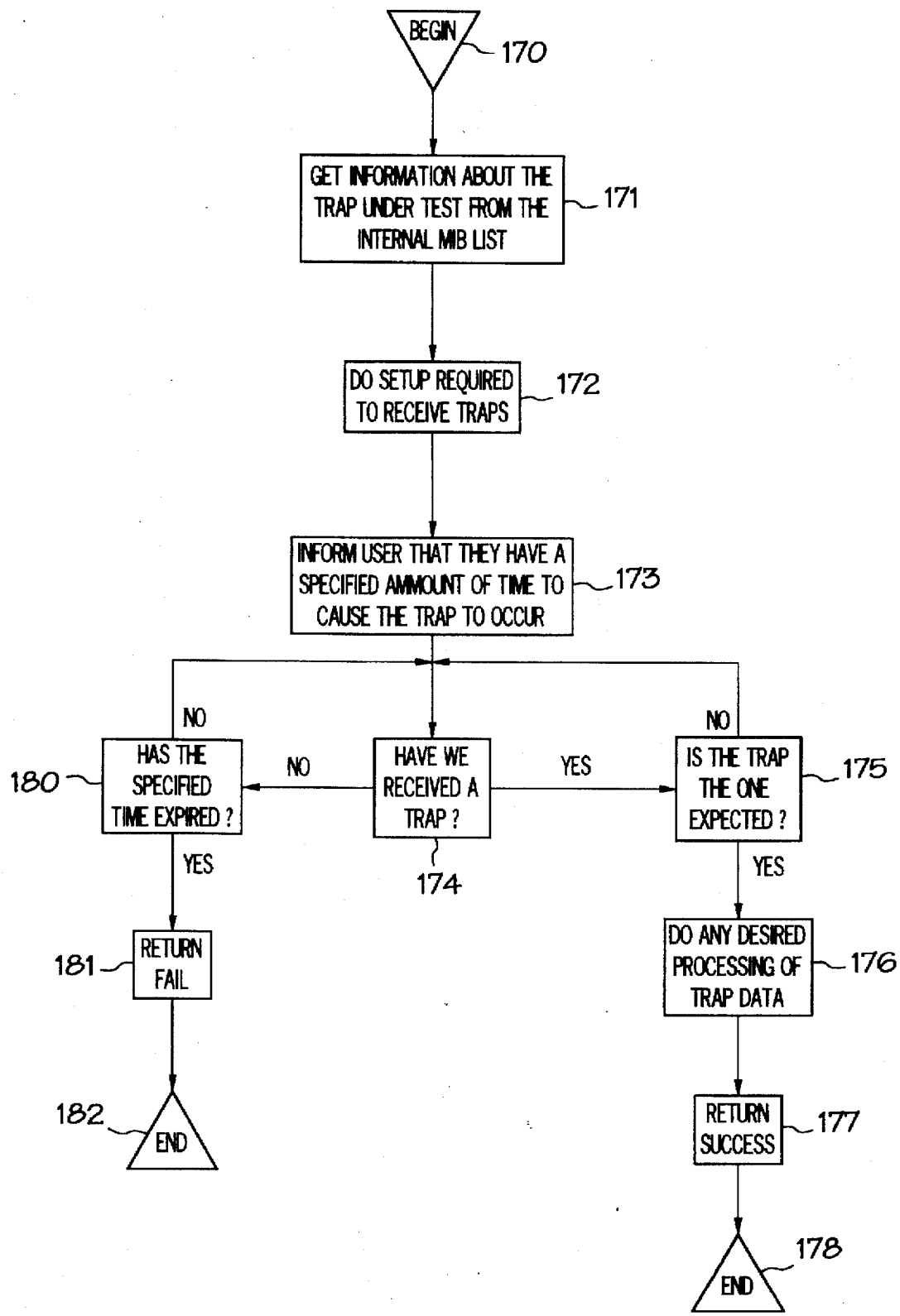
FIG. 10 is a flow diagram illustrating the method according to one preferred embodiment of this invention for testing a trap-type object in an object management system.

A process for testing trap objects according to one preferred embodiment of this invention is illustrated in the flow diagram shown in FIG. 10. At block 171 test signal generator 48 obtains information about the particular trap object under test from MIB parser 46. At block 172 the process prepares for receiving a trap object generated by object management system 60. At block 173 test signal generator 48 informs the user that the trap event must be generated within a predetermined amount of time. At blocks 174, 175 and 180, test signal generator 48 ignores unrelated trap objects, and determines if the specific trap object being tested is received within the predetermined amount of time. If the trap object is not received within the predetermined amount of time, at block 181 an error is returned. If the trap object being tested is received within the predetermined amount of time, then at block 176 any desired processing of the trap data is performed. At block 177 a successful return occurs.

Figure 11:
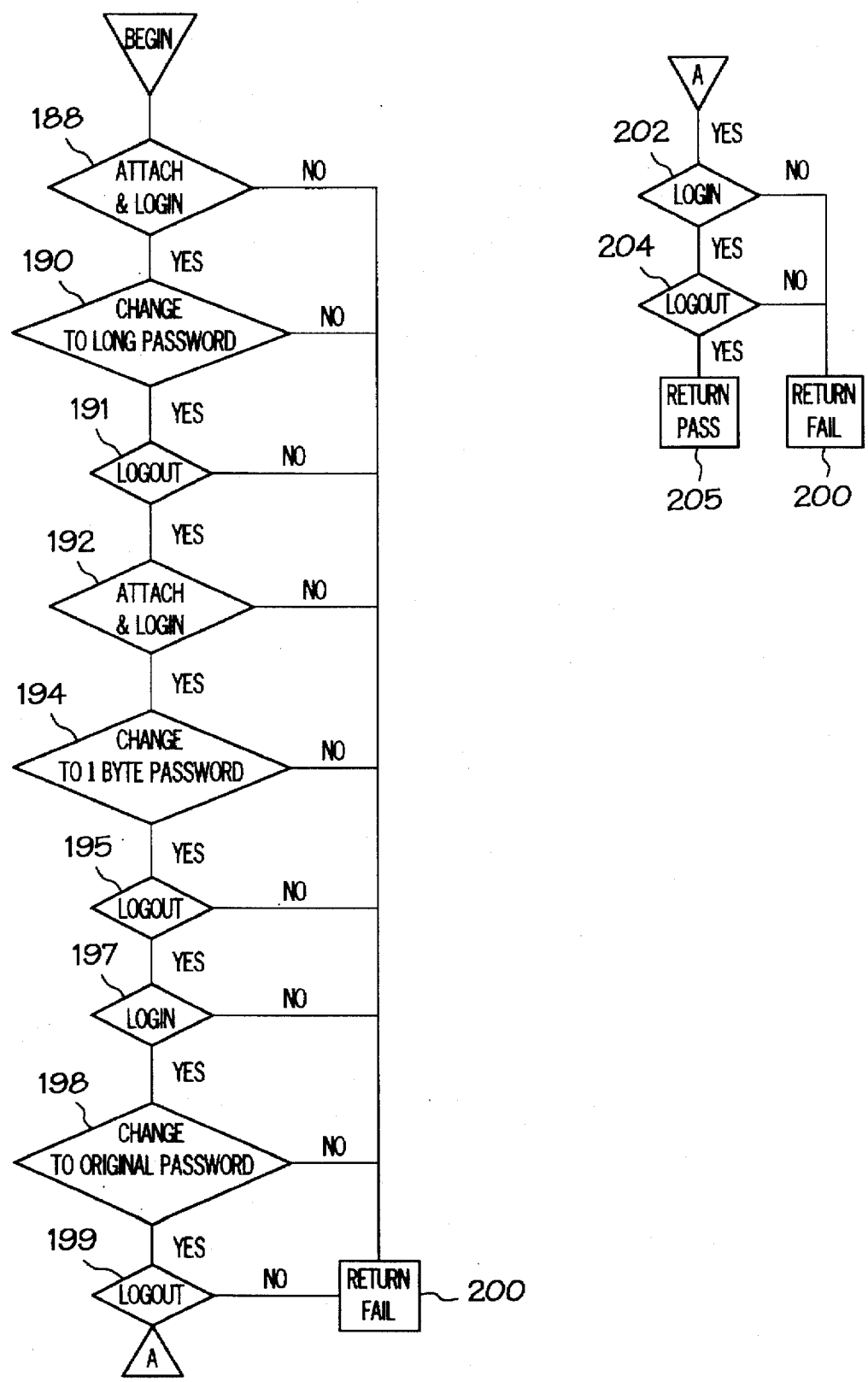
FIG. 11 is a flow diagram illustrating the method according to one embodiment of this invention for testing a login-type object in an object management system.

A login object is another type of object which can be implemented in object management system 60 under a network management protocol such as the NEST protocol. The method and apparatus according to this invention can also test such a login object as illustrated in FIG. 11. At block 188 test signal generator 48 communicates an attach and login request to object management system 60. If agent 64 responds with an invalid response code, a failure of the test signal is generated at block 200. If test signal generator 48 successfully logs into object management system 60, at block 190 test signal generator 48 changes the password of object management system 60 to a long password. If this modification is successful, at block 191 test signal generator 48 issues a logout request signal over the network to object management system 60. Test signal generator 48 then communicates another attach and login signal to object management system 60 using the long password used in block 190. If object management system 60 returns a successful response code at block 192, then at block 194 test signal generator 48 issues a test signal to object management system 60 to change the password to a one-byte password. At block 195 test signal generator 48 issues a test signal to logout from object management system 60. If no errors were returned by object management system 60 to these test signals, test signal generator 48 again issues a login test signal to object management system 60. If the login test signal is successful, test signal generator 48 issues a test signal to change the password to the original password. If the request is successful, test signal generator 48 issues a logout test signal to object management system 60 at block 199. At block 202 test signal generator 48 again attempts to login to object management system 60 and if successful, at block 204 issues a logout test signal to object management system 60. If this test signal is successful test signal generator 48 indicates that the test of the login object was successful.

According to yet another preferred embodiment of this invention, particular objects and/or particular attributes of the objects can be excluded from being tested. This may be desirable if a developer of agent software is aware of a particular problem in the implementation of an object, or if a particular test signal to a certain object may cause an undesirable action at the network attached device, such as a cold start. Test signal generator 48 can determine the existence of an exclusion list of objects either via user interface 41 or by the existence of an exclusion list file. Test signal generator 48 can obtain the exclusion information and exclude from its testing the particular objects and/or attributes requested. One syntax for accomplishing this exclusion processing can be achieved by entering into a file information in the following format.

| Object Name[!] | Excludes the variable from testing |
|---|---|
| Object Name[1, 3, 5] | Excludes the specified enumerations |
| Object Name "abc" | Uses the specified string for write testing |
| Object Name [#] | Ignores the returned write value |
| Object Name (10 . . . 57) | Uses alternate minimum and maximum values (first value is minimum and last value is maximum) |

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention in its practical application to thereby enable one of ordinary skill in the art to best utilize the invention in various embodiments and with various modifications as are suited the particular use contemplated. It is intended that the scope of the invention be defined by the claims appended hereto.

We claim:

1. A method for testing the implementation of an object in an object management system, the object management system including a plurality of objects and procedures for accessing the objects, the object management system being accessible over a network and associated with a network-attached device, comprising:
   a) identifying an object;
   b) automatically identifying at least one attribute of the object;
   c) automatically generating a test signal for testing the identified attribute, the test signal being generated as a function of the identified attribute; and
   d) communicating the test signal over the network to the object management system.

2. A method according to claim 1, further comprising receiving a response to the test signal, and analyzing the response to determine if the test signal failed.

3. A method according to claim 1, further comprising reporting a failure of the test signal.

4. A method according to claim 1, wherein the attribute of the object is identified by retrieving the at least one attribute of the object from a structure containing the names of the plurality of objects and the attributes corresponding to each of the plurality of objects.

5. A method according to claim 3, wherein the structure is a management information base compiler output file.

6. A method according to claim 1, wherein the test signal comprises one of an object query request and an object modification request which is a valid signal according to the identified attribute.

7. A method according to claim 1, wherein the test signal comprises one of an object query request and an object modification request which is an invalid signal according to the identified attribute.

8. A method according to claim 1, wherein failure of the test signal comprises receiving no response from the object management system for a predetermined length of time after communicating the test signal over the network.

9. A method according to claim 8, wherein the predetermined length of time is user-definable.

10. A method according to claim 1, wherein failure of the test signal comprises receiving a response indicating no error in response to an invalid test signal.

11. A method according to claim 1, wherein failure of the test signal comprises receiving a response indicating an error in response to a valid test signal.

12. A method according to claim 1, wherein steps (b) through (d) are repeated for a plurality of attributes of the object.

13. A method according to claim 1, further comprising automatically identifying the plurality of objects in the object management system, determining which objects of the plurality of objects are data-retaining objects, and repeating steps (b) through (d) for each data-retaining object.

14. A method according to claim 13, wherein the step of determining which objects are data-retaining objects is accomplished by classifying at least one type of object as a data-retaining object type, determining the object type of an object, comparing the object type of the object with the data-retaining object type, and if the object type of the object matches the data-retaining type, determining that the object is a data-retaining object.

15. A method according to claim 1, further comprising automatically identifying a plurality of objects of a particular type of object, and repeating steps (b) through (d) for each object of that particular type of object.

16. A method according to claim 1, further comprising displaying on a display device the plurality of objects in the object management system, and allowing selection by a user of at least one object whose implementation will be tested.

17. A method according to claim 1, further comprising obtaining an object exclusion list containing at least one object and at least one attribute of the at least one object which is to be bypassed for testing, and bypassing the at least one attribute of the at least one object from testing.

18. A method according to claim 1, further comprising obtaining an object exclusion list containing at least one object which is to be bypassed for testing, and bypassing the at least one object from testing.

19. A system for testing the attributes of an object in an object management system, the object management system including a plurality of objects and procedures for accessing the objects, the object management system being accessible over a network and associated with a network-attached device, the system comprising:
   a) an attribute identification subsystem for automatically identifying at least one attribute of the object;
   b) a signal generator for automatically generating a test signal for testing the identified attribute, the test signal generated as a function of the identified attribute; and
   c) means for communicating the test signal over the network to the object management system.

20. A system according to claim 19, further comprising a report process for reporting the attribute and the object if the test signal fails.

21. A method for testing the implementation of an object in an object management system, the object management system including a plurality of objects and procedures for accessing the objects, the object management system being accessible over a network and associated with a network-attached device, the method comprising:
   a) automatically identifying at least one attribute of the object; and
   b) determining if the object was implemented properly in the object management system as a function of an expected received value from the object management system.

22. A method according to claim 21 wherein the expected received value comprises a notification that an event corresponding to the network-attached device occurred.

* * * * *

UNITED STATES PATENT AND TRADEMARK OFFICE
CERTIFICATE OF CORRECTION

PATENT NO. : 5,737,518
DATED : April 7, 1998
INVENTOR(S) : Douglas M. Grover et al.

It is certified that error appears in the above-indentified patent and that said Letters Patent is hereby corrected as shown below:

Claim 5, line 1, replace "3" with --4--.

Signed and Sealed this

Fourteenth Day of July, 1998

Attest:

BRUCE LEHMAN

*Attesting Officer*        *Commissioner of Patents and Trademarks*